(12) United States Patent
Cho et al.

(10) Patent No.: US 12,189,237 B2
(45) Date of Patent: Jan. 7, 2025

(54) DISPLAY DEVICE

(71) Applicant: LG Display Co., Ltd., Seoul (KR)

(72) Inventors: Jung Ill Cho, Paju-si (KR); Sang Mook Lee, Paju-si (KR); Chang Kyeong Kong, Paju-si (KR); Seung Yeol Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/220,578

(22) Filed: Jul. 11, 2023

(65) Prior Publication Data

US 2024/0255802 A1  Aug. 1, 2024

(30) Foreign Application Priority Data

Jan. 27, 2023 (KR) .................. 10-2023-0011132

(51) Int. Cl.
*G02F 1/13357* (2006.01)
*G02F 1/1335* (2006.01)

(52) U.S. Cl.
CPC .. *G02F 1/133611* (2013.01); *G02F 1/133512* (2013.01); *G02F 1/133603* (2013.01)

(58) Field of Classification Search
CPC ......... G02F 1/133611; G02F 1/133512; G02F 1/133603

USPC .............................................. 362/97.1, 97.2
See application file for complete search history.

(56) References Cited

U.S. PATENT DOCUMENTS

| | | | |
|---|---|---|---|
| 10,852,577 B2* | 12/2020 | Kim | ............ G02B 6/0025 |
| 11,067,847 B2 | 7/2021 | Lee et al. | |
| 11,126,033 B2* | 9/2021 | Garbar | ............ G02F 1/133536 |
| 2018/0203293 A1 | 7/2018 | Lee et al. | |
| 2019/0094617 A1* | 3/2019 | Park | ............ G02F 1/133605 |

FOREIGN PATENT DOCUMENTS

KR    10-2017-0032868 A    3/2017

* cited by examiner

*Primary Examiner* — Laura K Tso
(74) *Attorney, Agent, or Firm* — Fenwick & West LLP (57) ABSTRACT

A display device includes an LED assembly, an optical sheet above the LED assembly, a plate above the optical sheet, a brightness enhancement film above the plate, a display panel above the brightness enhancement film, a light absorbing layer in contact with a first surface of the plate, and the light absorbing layer comprising a light absorbing material and an adhesive material, wherein the light absorbing material absorbs light having at least one wavelength between a wavelength of green light and a wavelength of red light, and wherein the brightness enhancement film or the optical sheet is in contact with a second surface of the plate.

19 Claims, 3 Drawing Sheets

DISPLAY DEVICE

CROSS-REFERENCE TO RELATED APPLICATION

This application claims priority to and the benefit of Republic of Korea Patent Application No. 10-2023-0011132, filed on Jan. 27, 2023, which is hereby incorporated by reference in its entirety.

BACKGROUND

Technical Field

The present disclosure relates to a display device, and more particularly, to a display device which has a light absorbing layer on a backlight unit so as to improve a color gamut of LED (light emitting device) light.

Discussion of the Related Art

Image display devices, which implement various information on a screen, are useful technologies in the information and communication era, and various display devices having excellent performance, such as slimness, light weight and low power consumption, are being developed.

Some existing display devices include a backlight unit. Such an existing display device obtains an image through color filters using a backlight source having a specific spectrum, and thus, color purity is affected by characteristics of various elements, such as a light source, the color filters, polarizing plates, and the like.

The light source which emits light from the rear surface of a display panel of the display device including the backlight unit has an emission spectrum not only having R, G and B wavelength ranges but also wavelengths between the respective R, G and B wavelengths as sub-bands. Color mixing of light emitted by such a light source with the color filters occurs, and thus causes reduction in a color gamut of the display device.

SUMMARY

Accordingly, the present invention is directed to a display device that substantially obviates one or more problems due to limitations and disadvantages of the related art.

An object of the present invention is to provide a display device which has a light absorbing layer on a backlight unit, and may thus absorb wavelengths between a green wavelength range and a red wavelength range in light emitted by an LED assembly so as to improve a color gamut of the display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In some embodiments, a display device includes a light emitting device (LED) assembly, an optical sheet on the LED assembly, a plate on the optical sheet, a brightness enhancement film on the plate, a display panel on the brightness enhancement film, and a light absorbing layer in contact with a first surface of the plate. The light absorbing layer includes a first absorbing material and an adhesive material. The light absorbing material absorbs light having a telast one wavelength between a wavelength of green light and a wavelength of a red light. The brightness enhancement film or the optical sheet is in contact with a second surface of the plate that is opposite the first surface of the plate.

In some embodiments, a display device includes a lower cover, a panel coupled to a side surface of the lower cover, a light emitting device (LED) assembly on the lower cover, an optical sheet on the LED assembly, a plate on the optical sheet, a brightness enhancement film on the plate, a display panel on the brightness enhancement film, a first fixing unit between the guide panel and the optical sheet, a second fixing unit between edges of the brightness enhancement film and the display panel, a printed circuit board connected to a side surface of the display panel, a light shielding tape that covers an outer surface of the printed circuit board, a protection unit on the side surfaces of the display panel, and a light absorbing layer in contact with a first surface of the plate. The light absorbing layer includes a light absorbing material and an adhesive material. The light absorbing material absorbs light having at least one wavelength between a wavelength of green light and a wavelength of red light. The brightness enhancement film or the optical sheet is in contact with a second surface of the plate that is opposite the first surface of the plate.

In some embodiments, a display device includes a light assembly configured to emit light of a plurality of different wavelengths including a first wavelength and a second wavelength that is different from the first wavelength, an optical sheet on the light assembly, and an adhesive light absorbing layer on the optical sheet. The adhesive light absorbing layer is configured to receive the emitted light of the plurality of different wavelengths and filter emitted light having a wavelength between the first wavelength and the second wavelength. The display device also includes a display panel on the light absorbing layer. the display panel is configured to receive the filtered light from the light absorbing layer and display an image using the filter light.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by the scope of claims.

The shapes, sizes, ratios, angles, numbers, and the like disclosed in the drawings for describing various embodiments of the present disclosure are merely examples, and thus, the present disclosure is not limited to the illustrated details. Like reference numerals refer to like elements throughout. In the following description, when the detailed description of the relevant known function or configuration is determined to unnecessarily obscure aspects of the present disclosure, the detailed description will be omitted.

When "comprise," "have," and "include" described in the present disclosure are used, another part may be added unless "only" is used. Terms in a singular form may include plural forms unless stated to the contrary.

In construing an element, the element is construed as including an error or tolerance range although there is no explicit description of such an error or tolerance range.

In describing a positional relationship, for example, when a positional relation between two parts is described as, for example, "on," "over," "under," and "next," one or more other parts may be disposed between the two parts unless a more limiting term, such as "just" or "direct(ly)" is used.

In describing a temporal relationship, for example, when the temporal order is described as, for example, "after," "subsequent," "next," and "before," a situation that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another, and may not define order. For example, a first element could be termed a second element within the scope of the present disclosure.

In the following description of the embodiments, "first horizontal axis direction," "second horizontal axis direction" and "vertical axis direction" should not be interpreted as having only geometrical relations in which parts are perpendicular to each other, and may mean wider orientations within the ranges in which elements of the disclosure functionally work.

The term "at least one" should be understood as including all combinations presented by one or more of associated elements. For example, "at least one of a first element, a second element or a third element" may not only mean the first element, the second element or the third element, respectively, but also mean all combinations presented by two or more of the first element, the second element and the third element.

Features of various embodiments of the present disclosure may be partially or wholly coupled to or combined with each other, and may be variously inter-operated with each other and driven technically as those skilled in the art can sufficiently understand. The embodiments of the present disclosure may be carried out independently from each other, or may be carried out together in a co-dependent manner.

In the drawings, wherever possible, the same elements will be denoted by the same reference numerals throughout the drawings even though they are depicted in different drawings. Further, the elements illustrated in the accompanying drawings may have scales different from the actual scales thereof for convenience of explanation, and are thus limited by the scales illustrated in the drawings.

Hereinafter, display devices according to embodiments of the present disclosure will be described in detail with reference to the accompanying drawings.

Figure 1:
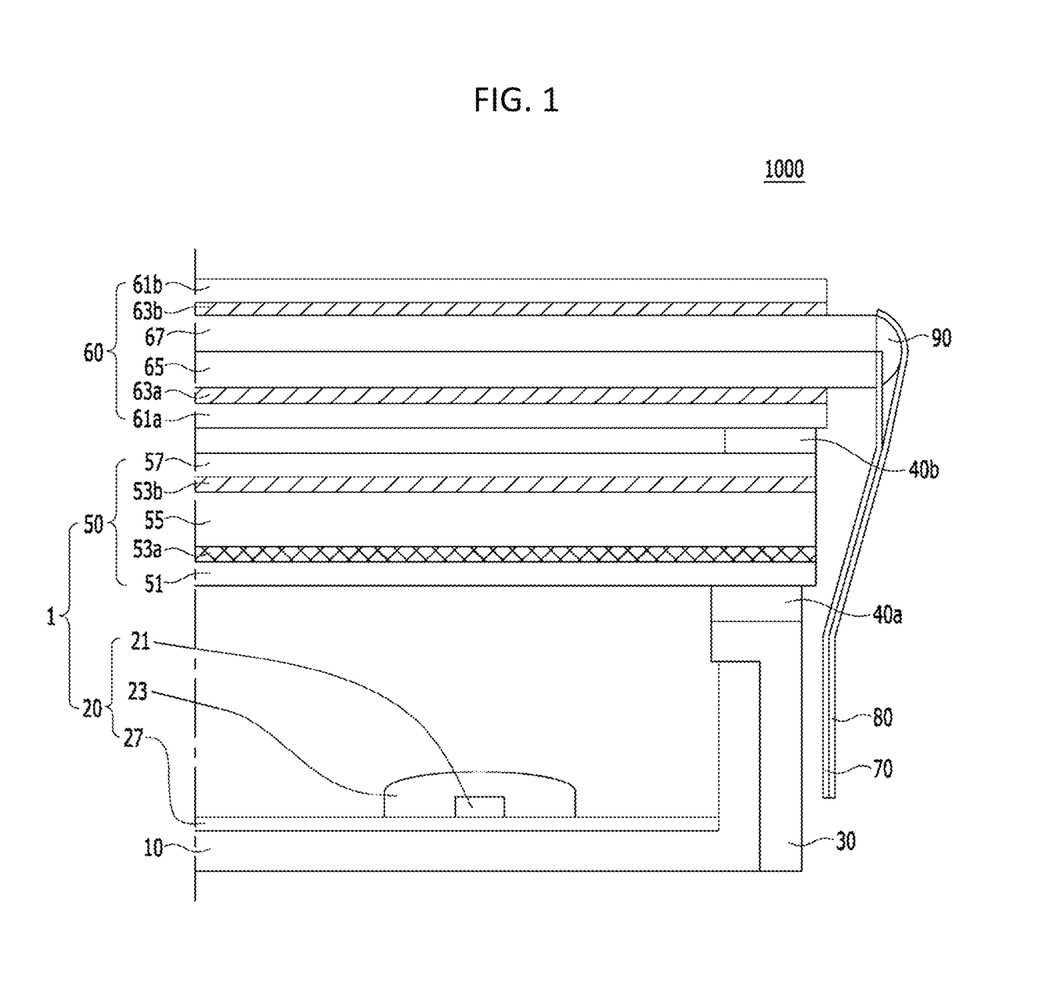
FIG. 1 is a cross-sectional view showing a display device according to one embodiment of the present disclosure.
Figure 2:
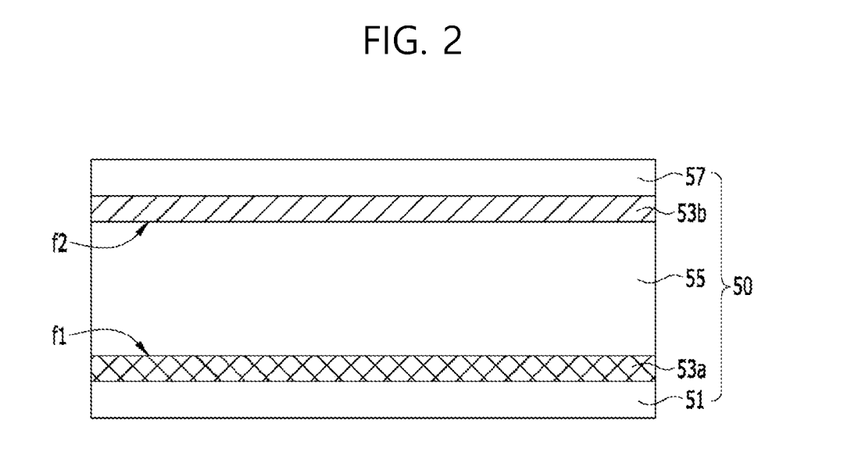
FIG. 2 is a cross-sectional view showing an optical sheet structure of FIG. 1 according to a first embodiment of the present disclosure.
Figure 3:
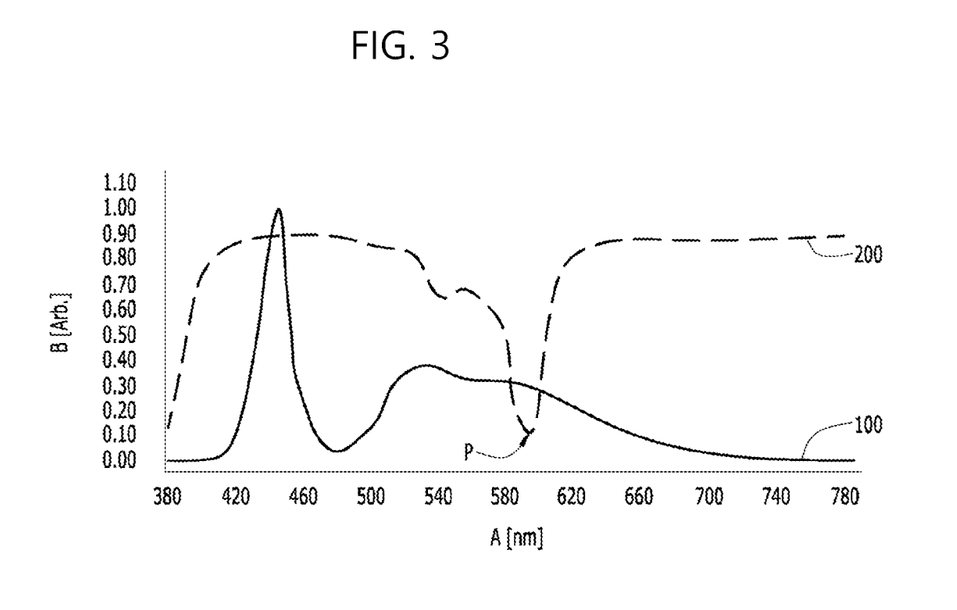
FIG. 3 is a graph representing an emission spectrum of LEDs and a transmittance spectrum of a light absorbing layer according to one embodiment of the present disclosure.
Figure 4:
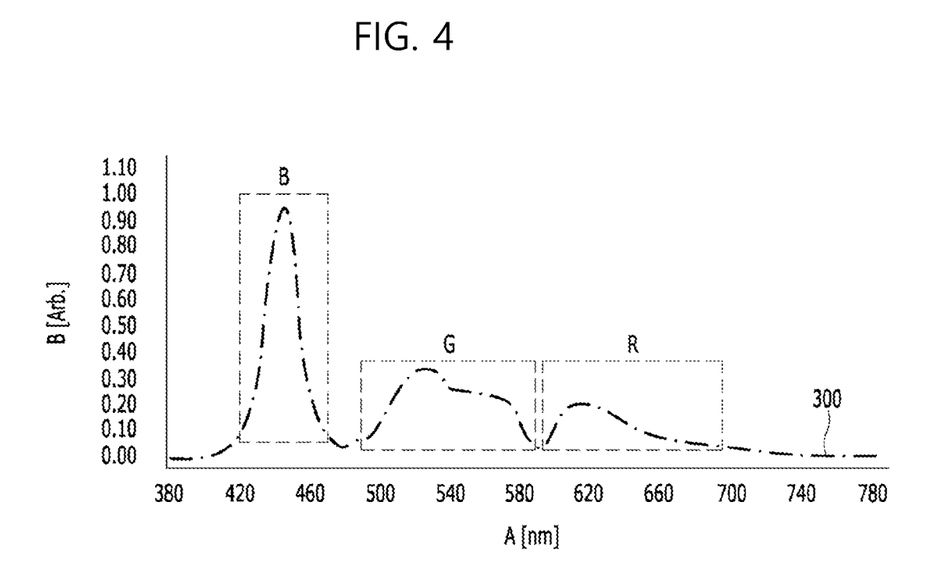
FIG. 4 is a graph representing a light spectrum in which LED light is changed by the light absorbing layer according to one embodiment of the present disclosure.

FIG. 1 is a cross-sectional view showing a display device 1000 according to one embodiment of the present disclosure, and FIG. 2 is a cross-sectional view showing an optical sheet structure 50 of FIG. 1 according to a first embodiment. Further, FIG. 3 is a graph representing an emission spectrum 100 of LEDs and a transmittance spectrum 200 of a light absorbing layer 53*a*, and FIG. 4 is a graph representing a light spectrum 300 in which LED light is changed by the light absorbing layer 53*a* according to the present invention. Here, A and B in FIGS. 3 and 4 indicate wavelength and intensity of light, respectively.

Referring to FIGS. 1 and 2, the display device 1000 according to the present disclosure may include a backlight unit 1 including an LED assembly 20 and the optical sheet structure 50, and a display panel 60 above or on the backlight unit 1.

The backlight unit 1 is disposed under the display panel 60, and is attached to the display panel 60 through a second fixing unit 40*b*. Further, the backlight unit 1 provides light emitted by the LED assembly 20 to the display panel 60. The backlight unit 1 may include a lower cover 10, a guide panel 30, the LED assembly 20, an optical sheet 51, the light absorbing layer 53*a*, a plate 55, a first adhesive layer 53*b*, and a brightness enhancement film 57.

The lower cover 10 may serve as an outer cover of the display device 1000, such as a notebook computer, a mobile device, a TV, or the like. The lower cover 10 may have a bottom surface and a side surface extending upward from the edge of the bottom surface, and the side surface of the lower cover 10 may be coupled to the guide panel 30. The LED assembly 20 may be provided inside the lower cover 10 and the guide panel 30 coupled to each other, and the optical sheet structure 50 may be attached to the upper parts of the lower cover 10 and the guide panel 30 coupled to each other by a first fixing unit 40*a*.

The LED assembly 20 may include an LED circuit board 27, LED chips 21 mounted on the LED circuit board 27, and a lens 23 provided on the LED circuit board 27 to cover the LED chips 21.

The LED circuit board 27 may be disposed on the flat plate-shaped bottom surface of the lower cover 10. A plurality of LED chips 21 may be mounted on the LED circuit board 27. The plurality of LED chips 21 may be operated by drive voltage supplied from the LED circuit board 27. The lens 23 configured to cover the LED chips 21 may be provided on the LED chips 21. The lens 23 may protect the LED chips 21, and may diffuse light emitted by the LED chips 21.

The optical sheet structure 50 may be disposed above or on the lower cover 10 and the guide panel 30 in which the LED assembly 20 is mounted. Concretely, the lowermost element of the optical sheet structure 50 may be fixed and attached to the guide panel 30 through the first fixing unit 40a. Here, the first fixing unit 40a may be formed of a material having adhesiveness and elasticity, and may include, for example, a resin. Further, the first fixing unit 40a may be provided between the guide panel 30 and the edge of the optical sheet structure 50, and may be provided in an area in which light from the LED assembly 20 is not emitted.

In the optical sheet structure 50 of the display device 1000 according to the present disclosure, the optical sheet 51 may be disposed on a first surface f1, which is the lower surface of the plate 55, by interposing the light absorbing layer 53a therebetween, and the brightness enhancement film 57 may be disposed on a second surface f2, which is the upper surface of the plate 55, by interposing the first adhesive layer 53b therebetween.

The plate 55 according to the present disclosure may be formed as a transparent flat plate having high light transmittance. Therefore, the plate 55 according to the present disclosure may have a function of preventing or at least reducing a likelihood of a plurality of optical sheets, such as the optical sheet 51 and the brightness enhancement film 57, from being deformed, or a function of fixing these optical sheets. Therefore, the embodiments described in the present disclosure may exhibit effects of preventing or at least reducing a likelihood of the optical sheets attached to the plate 55 from being damaged, i.e., contracting or expanding, due to tension, heat, moisture, and the like in a large-sized display device. Here, the first adhesive layer 53b and the light absorbing layer 53a configured to attach the optical sheets to the plate 55 may be integrated with the surfaces of the plate 55.

Further, the plate 55 may correspond to the entirety of an area in which the LED assembly 20 is located, and may have an area equal to or greater than the active area of the display panel 60 located above the plate 55 so as to uniformly transmit light to the display panel 60.

The plate 55 is formed of a material which is a kind of glass, and has visible light transmittance of 96% or more. For example, the plate 55 may be formed of soda-lime glass. The plate 55 formed of soda-lime glass may include at least one of silicon (Si), aluminum (Al), magnesium (Mg), calcium (Ca), lithium (Li), sodium (Na), potassium (K), iron (Fe), chromium (Cr), manganese (Mn), cobalt (Co), titanium (Ti), sulfur (S), or selenium (S). However, the plate 55 according to the present disclosure is not limited thereto, and various kinds of glass other than soda-lime glass may be used as the plate 55 as long as they have excellent transmittance and a function of transmitting upward light from a light source.

As shown in FIG. 2, the light absorbing layer 53a may come into contact with the first surface f1 of the plate 55.

The light absorbing layer 53a may include an adhesive material and a light absorbing material. The adhesive material may be the same as an adhesive material in the first adhesive layer 53b coming into contact with the other surface of the plate 55, but is not limited thereto. Therefore, the light absorbing layer 53a including the adhesive material may have a function of laminating the optical sheet 51 and the plate 55 or attaching the optical sheet 51 and the plate 55. For example, the adhesive material of the light absorbing layer 53a may be an acrylic material or a silicon-based material, and may be an adhesive material which may perform one of moisture curing, thermal curing, and ultraviolet (UV) curing. For example, UV curable adhesive materials may include urethane, acrylate, polyester, fluorinated resins for adjusting viscosity, and the like.

The light absorbing layer 53a including the adhesive material may be formed on the entirety of the first surface f1 of the plate 55, and allows the optical sheet 51, which is easily deformable due to heat or external force, to be completely attached to the plate 55 which is scarcely deformed. Therefore, the optical sheet 51 is fixed to the plate 55, and thus, shape deformation, such as wrinkles, which may occur in reliability evaluation environments, may not occur. Further, because the optical sheet 51 is fixed to the plate 55 by the light absorbing layer 53a, a conventional sheet hanger configured to fix an optical sheet may be omitted.

The light absorbing layer 53a including the light absorbing material may absorb some wavelengths of light emitted by the LED assembly 20. Referring to FIG. 3, the emission spectrum 100 of LEDs may include not only wavelength ranges corresponding to red, green and blue but also wavelength ranges between the wavelength ranges corresponding to red, green and blue light. Color mixing of light emitted by the LEDs with red, green and blue color filters of the display panel occurs, and thus causes reduction in a color gamut due to light between the red, green and blue wavelength ranges. Particularly, the emission spectrum 100 of the LEDs is characterized in that the blue wavelength range having a high intensity is separated from the green and red wavelength ranges, but the green and red wavelength ranges are not separated from each other. Here, the display device 1000 according to the present disclosure may absorb light between the green and red wavelength ranges through the light absorbing layer 53a including the light absorbing material above the LED assembly 20, thereby being capable of separating the green and red wavelength ranges from each other.

The light absorbing material of the light absorbing layer 53a may include a porphyrin-based material. However, the light absorbing material according to the present disclosure is not limited thereto, and may be any material which absorbs light between the green and red wavelength ranges.

Referring to FIG. 3, depending on the transmittance spectrum 200 of the light absorbing layer 53a, the light absorbing material of the light absorbing layer 53a does not transmit light between the green and red wavelength ranges. The light absorbing layer 53a may have an absorption peak wavelength p in the wavelength range of 580 nm to 620 nm between the green and red wavelength ranges.

Referring to the light spectrum 300 of FIG. 4, as a result of installation of the light absorbing layer 53a on the path of LED light from the LED assembly 20, the green wavelength range G and the red wavelength range R in the LED light having passed through the light absorbing layer 53a are separated from each other at a point where the absorption peak wavelength p is about 590 nm by the light absorbing material of the light absorbing layer 53a. Thereby, the display device 1000 according to the present disclosure separates LED light into the red (R) wavelength range, the green (G) wavelength range, and the blue (B) wavelength range via the light absorbing layer 53a, and may thus enhance a color gamut during color mixing of the LED light with a color filter substrate 67.

As illustrated in the following example embodiment, the light absorbing material of the light absorbing layer 53a may be tetra-azaporphyrin. In the following example embodiment, the absorption peak wavelength p of tetra-azaporphyrin is 592 nm, and tetra-azaporphyrin in respective light absorbing layers 53a having different thicknesses has a specific gravity of about 0.045 wt %. Under the above example conditions, the display device 1000 according to the present disclosure may have the following characteristics.

Further, a color gamut measured in the example embodiment indicates the range of colors overlapping the Digital Cinema Initiatives (DCI) color space. The DCI color space is a standard color space defined for digital movie projection in the U.S. film industry, and the DCI color space may be at least 25% wider than the conventional sRGB color space.

The color gamut in the present disclosure refers to a percentage of colors represented by the display device overlapping the DCI color space.

TABLE 1

| Thickness of light absorbing layer (μm) | Absorption peak wavelength of light absorbing layer (nm) | Luminous efficacy of display device (%) | Color gamut of display device (based on DCI: %) |
|---|---|---|---|
| 50 | 592 | 85.4 | 88.7 |
| 60 | 592 | 80.7 | 90.7 |
| 70 | 592 | 74.2 | 91.3 |

As set forth in Table 1, it may be confirmed that, as the actual content of the light absorbing material in the light absorbing layer 53a increases, the color gamut of the display device is increased from about 88% to about 92%, and the luminance efficiency of the display device is decreased from about 85% to about 75%. That is, the light absorbing material in the light absorbing layer 53a may affect not only the color gamut of the display device but also the luminance efficiency of the display device.

When the content of the light absorbing material in the light absorbing layer 53a exceeds 0.1 wt %, the light absorbing material shields light on the whole, and may thus remarkably reduce luminance. Therefore, in the display device according to the present disclosure, the light absorbing layer 53a may be configured such that the content of the light absorbing material in the light absorbing layer 53a is equal to or less than 0.1 wt % in consideration of luminance efficiency.

The light absorbing layer 53a may further include a UV stabilizer in addition to the adhesive material and the light absorbing material. The UV stabilizer may be additionally provided to prevent or at least reduce a likelihood of degradation of the light absorbing material in the light absorbing layer 53a.

The optical sheet 51 attached to the plate 55 through the light absorbing layer 53a may be located above the LED assembly 20, and may condense and diffuse LED light from the LED assembly 20. One or more optical sheets 51 according to the present disclosure may be provided. When a plurality of optical sheets 51 is provided, the respective optical sheets 51 may have a flat surface, and may increase the light diffusion function as well as transmit light transmitted from below. The optical sheet 51 has a smaller thickness than the plate 55. Further, the size of the optical sheet 51 may be equal to the size of the display panel 60 or may be greater than the size of the active area of the display panel 60 so as to transmit uniform optical effects to the display panel 60. In some cases, the size of the optical sheet 51 may be equal to the size of the plate 55.

For example, the optical sheet 51 may be formed in a structure in which a prism sheet having prism apexes disposed in one direction and a prism sheet having prism apexes disposed in a direction perpendicular to the direction are stacked, so as to condense LED light from the LED assembly 20. In this case, the optical sheet 51 may further include a separate diffusion sheet or beads configured to uniformly diffuse the LED light from the LED assembly 20, on the surface of the prism sheet closer to the LED assembly 20, which faces the LED assembly 20.

The first adhesive layer 53b coming into contact with the second surface f2 of the plate 55 has a function of laminating the brightness enhancement film 57 and the plate 55. The first adhesive layer 53b may be formed of an adhesive material of the same family as the adhesive material of the light absorbing layer 53a. That is, the first adhesive layer 53b may be formed of an acrylic material or a silicon-based material, and may be formed of an adhesive material which may perform one of moisture curing, thermal curing, and UV curing.

The brightness enhancement film 57 attached to the second surface f2 of the plate 55 by the first adhesive layer 53b may employ a sheet, such as a dual brightness enhancement film (DBEF), thereby being capable of maximizing or at least increasing luminance enhancement through light recycling. The brightness enhancement film 57 has at least a smaller thickness than the plate 55. Further, the size of the brightness enhancement film 57 may be equal to the size of the display panel 60 or may be greater than the size of the active area of the display panel 60 so as to transmit uniform optical effects to the display panel 60. In some cases, the size of the brightness enhancement film 57 may be equal to the size of the plate 55. Further, the display device 1000 according to the present disclosure is not limited to FIGS. 1 and 3, and may further include optical sheets provided on the lower or upper surfaces of the enhancement film 57 by other adhesive layers so as to enhance luminance, if needed.

The display panel 60 may be disposed above or on the brightness enhancement film 57 by the second fixing unit 40b. The second fixing unit 40b may be provided between the edges of the brightness enhancement film 57 and the display panel 60 facing each other, and may be provided to correspond to the non-active area of the display panel 60. The display panel 60 may include a lower polarizing plate 61a, a second adhesive layer 63a, a TFT array substrate 65, the color filter substrate 67, a third adhesive layer 63b, and an upper polarizing plate 61b.

The lower polarizing plate 61a may be attached to the lower surface of the TFT array substrate 65 through the second adhesive layer 63a. The lower polarizing plate 61a may polarize LED light having sequentially passed through the backlight unit 1 and the optical sheet structure 50. Here, the second adhesive layer 63a may be formed of an adhesive material of the same family as the first adhesive layer 53b, but the present invention is not limited thereto.

The display panel 60 may further include a display layer configured to display an image in a cell gap between the color filter substrate 67 and the TFT array substrate 65, as an element provided on the lower polarizing plate 61a. A plurality of subpixels is arranged on the display panel 60, thereby being capable of outputting an image. For example, the display layer may be a liquid crystal layer. Hereinafter, the display panel 60 having a liquid crystal layer in the display device 1000 according to the present disclosure will be descried as an example.

A common electrode and pixel electrodes are formed on the display panel 60 and, when an electric field is applied to the liquid crystal layer, voltage of data signals applied to the pixel electrodes may be controlled under the state in which voltage is applied to the common electrode. Therefore, liquid crystals in the liquid crystal layer are rotated depending on the electric field between the common electrode and the pixel electrodes, and the respective subpixels may transmit or block light, thereby being capable of displaying an image.

Gate lines and data lines arranged vertically and horizontally to define the subpixels may be formed on the TFT array substrate 65, and thin film transistors TFT may be formed at intersecting points between the gate lines and the data lines. The thin film transistors TFT may include a switching thin film transistor, a driving thin film transistor, and the like, which are provided in each of the plurality of subpixels so as to control each of the subpixels depending on data signal voltage.

The color filter substrate 67 may include a plurality of sub color filters configured to implement red, green and blue, a black matrix configured to divide the respective sub color filters from one another so as to block light, and an overcoat layer configured to cover the plurality of sub color filters and the black matrix.

The upper polarizing plate 61b may be attached to the upper surface of the color filter substrate 67 through the third adhesive layer 63b. The upper polarizing plate 61b may polarize the LED light having sequentially passed through the lower polarizing plate 61a, the liquid crystal layer and the color filter substrate 67. Here, the third adhesive layer 63b may be formed of an adhesive material of the same family as the second adhesive layer 63a, but the present invention is not limited thereto.

A printed circuit board 70, a protection unit 90, and a light shielding tape 80 may be provided outside the display panel 60.

The printed circuit board 70 may be connected to at least one side surface of the TFT array substrate 65, and various circuits configured to apply source voltage, data signals, gate signals, and the like to the TFT array substrate 65 may be mounted in the printed circuit board 70.

The protection unit 90 may prevent or at least reduce a likelihood of the TFT array substrate 65 and the color filter substrate 67 from protruding outward from the lower polarizing plate 61a and the upper polarizing plate 61b of the display panel 60 from cracking, and may protect the protruding portions of the TFT array substrate 65 and the color filter substrate 67. Further, the protection unit 90 may be provided between the printed circuit board 70 and the light shielding tape 80 on the side surface of the display panel 60.

The light shielding tape 80 may be provided to cover the outer surface of the printed circuit board 70 and to cover the non-active area of the display device 1000 or the outer surface of the display device 1000 in the outermost area of the display device 1000. The light shielding tape 80 may include a black pigment so that the inside of the display device 1000 is invisible, and may allow the elements, such as the printed circuit board 70 and the display panel 60, to be invisible from the outside.

Figure 5:
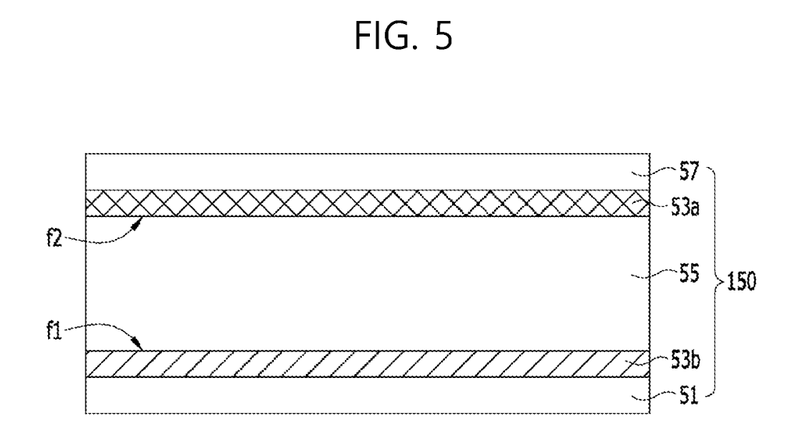
FIG. 5 is an enlarged cross-sectional view showing an optical sheet structure of FIG. 1 according to a second embodiment of the present disclosure.

FIG. 5 is an enlarged cross-sectional view showing an optical sheet structure 150 of FIG. 1 according to a second embodiment. A detailed description of elements of the second embodiment which are substantially the same as those of the earlier embodiment will be omitted.

Referring to FIG. 5, the optical sheet structure 150 according to the second embodiment may include an optical sheet 51 coming into contact with a first surface f1 of a plate 55 through a first adhesive layer 53b, and a brightness enhancement film 57 coming into contact with a second surface f2 of the plate 55 through a light absorbing layer 53a. The color gamut or luminance efficiency of a display device according to the second embodiment, in which the light absorbing layer 53a is located on the upper surface of the plate 55, may be changed a little depending on the characteristics of the plate 55, compared to the first embodiment. That is, LED light further passes through the plate 55, compared to the first embodiment, and thereby, the color gamut and luminance efficiency of the display device may be changed a little.

When the plate 55 employs glass having no function against LED light, the display device according to the second embodiment may exhibit the same color gamut and luminance efficiency as the first embodiment under the same conditions of the light absorbing layer 53a as the first embodiment.

As in the first and second embodiments, the light absorbing layer 53a according to the present disclosure includes an adhesive material, and may thus be provided in place of any layer having an adhesive function. Further, when a separate optical sheet is provided under the optical sheet 51 or on the brightness enhancement film 57, the light absorbing layer 53a may be provided in place of an adhesive layer therebetween, and therefore, the light absorbing layer 53a may be easily formed. In some embodiments, the light absorbing layer 53a can be provided on both surfaces. In this case, the light absorbing layer 53a may be attached to an optical film or an optical sheet at a lower part and at an upper part of the plate 55.

Here, change in the position of the light absorbing layer 53a may affect the color gamut and luminance efficiency changes of the display device. That is, the light absorbing layer 53a has a function of absorbing light, and may thus have the mutual relations with optical sheets having functions of diffusing, absorbing light, and the like. Concretely, because the light absorbing layer 53a according to the present disclosure is provided in the optical sheet structure 50, the luminance and intensity of light may be compensated for by optical sheets (the optical sheet 51 and the brightness enhancement film 57) coming into contact with the light absorbing layer 53a. Thereby, the light absorbing layer 53a does not affect changes in characteristics of the display device, such as the luminance and intensity of light emitted by the display device, and may be involved in only color gamut properties.

When the light absorbing layer 53a is provided in place of the adhesive layer structure of the display panel 60, the characteristics of the display device may be changed. When the light absorbing layer 53a having the function of absorbing light is provided in the display panel 60, the light absorbing layer 53a may be disposed on the upper surface of the lower polarizing plate 61a or the lower surface of the upper polarizing plate 61b in place of the adhesive layer. In this case, the light absorbing layer 53a between the lower polarizing plate 61a and the upper polarizing plate 61b absorbs polarized light, and may thus affect a degree of polarization which is to be set originally. That is, the light absorbing layer 53a between the polarizing plates 61a and 61b may change the degree of polarization of the polarizing plates 61a and 61b, and may affect changes in the optical characteristics of the display device. Therefore, the light absorbing layer 53*a* according to the present disclosure may be provided in place of an adhesive material, and it is desirable that the light absorbing layer 53*a* be provided in the backlight unit 1.

The display device 1000 according to the present disclosure has the light absorbing layer 53*a*, and may thus have the following effects.

The display device 1000 according to the present disclosure includes the light absorbing layer 53*a* configured to absorb wavelengths between the green wavelength range and the red wavelength range, and may thus separate the green wavelength range and the red wavelength range of LED light from each other, and thereby, the color gamut of the display device 1000 may be enhanced to 90% or more. Further, the light absorbing layer 53*a* is configured such that the content of the light absorbing material in the light absorbing layer 53*a* is equal to or less than 0.1 wt %, and may thus enhance the color gamut of the display device 1000 according to the present disclosure while maintaining the luminance of the display device 1000. Here, because the light absorbing layer 53*a* according to the present disclosure is provided in the backlight unit 1, change in the luminance or intensity of light by the light absorbing layer 53*a* may be reduced, and therefore, the light absorbing layer 53*a* may be involved in only the color gamut while maintaining the luminance and intensity of light emitted by the display device 1000. Further, the light absorbing layer 53*a* is formed of an adhesive material, and may thus be provided in place of an adhesive layer in the display device 1000 according to the present disclosure, and therefore, the light absorbing layer 53*a* may be applied without change in the structure of the display device 1000.

In some cases, when the display device 1000 is formed in a large size, optical sheets formed in a size corresponding to the display device 1000 may be easily deformed, i.e., wrinkled, due to tension, heat, moisture, and the like. However, the display device 1000 according to the present disclosure includes one integrated optical sheet structure 50 or 150 formed by bonding optical sheets to the plate 55 using an adhesive material provided on both surfaces of the plate 55, thereby being capable of preventing the optical sheets from being damaged in the large-sized display device 1000.

As is apparent from the above description, a display device according to the present disclosure has the following effects.

First, the display device according to the present disclosure includes a light absorbing layer configured to absorb wavelengths between the green wavelength range and the red wavelength range, thereby being capable of having an enhanced color gamut.

Second, the display device according to the present disclosure includes the light absorbing layer including 0.1 wt % or less of a light absorbing material, thereby being capable of having the enhanced color gamut while maintaining the luminance of the display device.

Third, the display device according to the present disclosure includes one integrated optical sheet structure formed by bonding optical sheets to a plate using an adhesive material provided on both surfaces of the plate, thereby being capable of preventing the optical sheets from being damaged when the display device is formed in a large size.

Fourth, the display device according to the present disclosure has the enhanced color gamut through the light absorbing layer, and replaces a conventional adhesive layer with the light absorbing layer and does not require a separate space occupied by the light absorbing layer. Therefore, the display device according to the present disclosure may reduce power consumption and energy production, and thus has an Environmental, Social, and Governance (ESG) effect.

The display device according to one embodiment of the present disclosure is described as follows.

The display device according to one embodiment of the present disclosure may include an LED assembly, an optical sheet, a plate, and a brightness enhancement film sequentially stacked above the LED assembly, a display panel above the brightness enhancement film, a light absorbing layer contacting with a first surface of the plate, and the light absorbing layer comprising a light absorbing material and an adhesive material, wherein the light absorbing material absorbs at least one wavelength between green and red, and wherein the brightness enhancement film or the optical sheet are in contact with a second surface of the plate.

In the light emitting display device according to one embodiment of the present disclosure, the light absorbing layer comprises a porphyrin-based material.

In the light emitting display device according to one embodiment of the present disclosure, a peak wavelength absorbed by the light absorbing layer is in a range of 580 nm to 600 nm.

In the light emitting display device according to one embodiment of the present disclosure, a content of the light absorbing material in the light absorbing layer is equal to or less than 0.1 wt %.

In the light emitting display device according to one embodiment of the present disclosure, the adhesive material comprises an acrylic material or a silicon-based material.

In the light emitting display device according to one embodiment of the present disclosure, the light absorbing layer further comprises a UV stabilizer.

In the light emitting display device according to one embodiment of the present disclosure, further comprising a first adhesive layer on the second surface of the plate, wherein the first adhesive layer attaches the brightness enhancement film or the optical sheet.

In the light emitting display device according to one embodiment of the present disclosure, the plate comprises glass.

It will be apparent to those skilled in the art that various modifications and variations can be made in the present disclosure without departing from the spirit or scope of the disclosure. Thus, it is intended that the present disclosure cover the modifications and variations of the present disclosure provided they come within the scope of the appended claims and their equivalents.

What is claimed is:
1. A display device comprising:
a light emitting device (LED) assembly;
an optical sheet on the LED assembly;
a plate on the optical sheet;
a brightness enhancement film on the plate;
a display panel on the brightness enhancement film; and
a light absorbing layer in contact with a first surface of the plate, the light absorbing layer comprising a light absorbing material and an adhesive material,
wherein the light absorbing material absorbs light having at least one wavelength between a wavelength of green light and a wavelength of a red light, and
wherein the brightness enhancement film or the optical sheet is in contact with a second surface of the plate that is opposite first surface of the plate.
2. The display device according to claim 1, wherein the light absorbing layer comprises a porphyrin-based material.

3. The display device according to claim 1, wherein a peak wavelength absorbed by the light absorbing layer is in a range of 580 nm to 600 nm.

4. The display device according to claim 1, wherein the light absorbing material is less than or equal to 0.1 wt % of the light absorbing layer.

5. The display device according to claim 1, wherein the adhesive material comprises an acrylic material or a silicon-based material.

6. The display device according to claim 1, wherein the light absorbing layer further comprises a ultra-violet (UV) stabilizer.

7. The display device according to claim 1, further comprising:
a first adhesive layer on the second surface of the plate, the first adhesive layer attaching the brightness enhancement film to the second surface of the plate or the optical sheet to the second surface of the plate.

8. The display device according to claim 1, wherein the plate comprises glass.

9. A display device comprising:
a lower cover;
a guide panel coupled to a side surface of the lower cover;
a light emitting device (LED) assembly on the lower cover;
an optical sheet on the LED assembly;
a plate on the optical sheet;
a brightness enhancement film on the plate;
a display panel on the brightness enhancement film;
a first fixing unit between the guide panel and the optical sheet;
a second fixing unit between edges of the brightness enhancement film and the display panel;
a printed circuit board connected to a side surface of the display panel;
a light shielding tape that covers an outer surface of the printed circuit board;
a protection unit on the side surface of the display panel; and
a light absorbing layer in contact with a first surface of the plate, the light absorbing layer comprising a light absorbing material and an adhesive material,
wherein the light absorbing material absorbs light having at least one wavelength between a wavelength of green light and a wavelength of red light, and
wherein the brightness enhancement film or the optical sheet is in contact with a second surface of the plate that is opposite the first surface of the plate.

10. The display device according to claim 9, wherein the protection unit is between the printed circuit board and the light shielding tape.

11. A display device comprising:
a light assembly configured to emit light of a plurality of different wavelengths including a first wavelength and a second wavelength that is different from the first wavelength;
an optical sheet on the light assembly;
an adhesive light absorbing layer on the optical sheet, the adhesive light absorbing layer configured to receive the emitted light of the plurality of different wavelengths and filter emitted light having a wavelength between the first wavelength and the second wavelength; and
a display panel on the adhesive light absorbing layer, the display panel configured to receive the filtered light from the adhesive light absorbing layer and display an image using the filtered light,
wherein the first wavelength comprises green light and the second wavelength comprises red light and the wavelength of the filtered light is between the green light and the red light.

12. The display device of claim 11, further comprising:
a plate on the adhesive light absorbing layer such that the adhesive light absorbing layer is between the plate and the optical sheet, the plate configured to reduce deformation of the optical sheet or the light absorbing layer.

13. The display device of claim 12, wherein the adhesive light absorbing layer comprises an adhesive material configured to bind the optical sheet and the plate.

14. The display device of claim 12, further comprising:
a brightness enhancement layer on the plate such that the plate is between the brightness enhancement layer and the adhesive light absorbing layer, the brightness enhancement layer configured to increase luminance through light recycling.

15. The display device of claim 14, further comprising:
an adhesive layer between the brightness enhancement layer and the plate, the adhesive layer configured to bind the plate and the brightness enhancement layer.

16. The display device of claim 11, further comprising:
a plate between the adhesive light absorbing layer and the optical sheet, the plate configured to reduce deformation of the optical sheet or the light absorbing layer.

17. The display device of claim 16, further comprising:
an adhesive layer between the optical sheet and the plate, the adhesive layer configured to bind the optical sheet and the plate.

18. The display device of claim 16, further comprising:
a brightness enhancement layer on the adhesive light absorbing layer such that the adhesive light absorbing layer is between the brightness enhancement layer and the plate, the brightness enhancement layer configured to increase luminance through light recycling.

19. The display device of claim 18, wherein the adhesive light absorbing layer comprises an adhesive material configured to bind the brightness enhancement layer and the plate.

* * * * *